US009087337B2

(12) United States Patent
Ho et al.

(10) Patent No.: US 9,087,337 B2
(45) Date of Patent: Jul. 21, 2015

(54) DISPLAYING VERTICAL CONTENT ON SMALL DISPLAY DEVICES

(75) Inventors: Ching-Lan Ho, Palo Alto, CA (US); Douglas Felt, Menlo Park, CA (US)

(73) Assignee: Google Inc., Mountain View, CA (US)

(*) Notice: Subject to any disclaimer, the term of this patent is extended or adjusted under 35 U.S.C. 154(b) by 892 days.

(21) Appl. No.: 12/245,511

(22) Filed: Oct. 3, 2008

(65) Prior Publication Data
US 2010/0088591 A1 Apr. 8, 2010

(51) Int. Cl.
G06Q 30/02 (2012.01)
G09G 5/14 (2006.01)
G09G 5/24 (2006.01)

(52) U.S. Cl.
CPC .......... G06Q 30/02 (2013.01); G09G 5/14 (2013.01); G09G 5/246 (2013.01); G09G 2340/0492 (2013.01); G09G 2340/145 (2013.01)

(58) Field of Classification Search
CPC ............ G06F 17/211; G06F 17/30905; G06F 17/2223; G06K 9/3208
USPC ........................................................ 715/247
See application file for complete search history.

(56) References Cited

U.S. PATENT DOCUMENTS

| 4,467,448 A * | 8/1984 | Regehr et al. ................. 358/1.16 |
| 4,992,959 A * | 2/1991 | Hamada et al. ............... 358/1.11 |
| 4,995,089 A * | 2/1991 | Altrieth, III ..................... 382/297 |
| 5,052,834 A * | 10/1991 | Feistel et al. ..................... 358/1.8 |
| 5,175,684 A * | 12/1992 | Chong .............................. 704/3 |
| 5,295,238 A * | 3/1994 | Dickson ........................ 345/471 |
| 5,327,342 A * | 7/1994 | Roy ............................... 345/467 |
| 5,508,810 A * | 4/1996 | Sato ............................... 358/296 |
| 5,535,120 A * | 7/1996 | Chong et al. ....................... 704/3 |
| 5,617,528 A * | 4/1997 | Stechmann et al. ........... 715/201 |
| 5,813,018 A * | 9/1998 | Kaji et al. ...................... 715/236 |
| 5,956,738 A * | 9/1999 | Shirakawa ..................... 715/273 |
| 5,960,229 A * | 9/1999 | Fukuoka et al. ................. 399/17 |
| 6,181,433 B1* | 1/2001 | Hayama et al. ............... 358/1.12 |
| 6,188,385 B1* | 2/2001 | Hill et al. ...................... 345/614 |
| 6,229,519 B1* | 5/2001 | Narusawa ..................... 345/660 |

(Continued)

FOREIGN PATENT DOCUMENTS

| CN | 1808423 | 7/2006 |
| CN | 1828602 | 9/2006 |

(Continued)

OTHER PUBLICATIONS

Robust Vertical Text Layout by Elika J. Etemad Apr. 2005.*

(Continued)

*Primary Examiner* — Omar Abdul-Ali
*Assistant Examiner* — Phoebe Pan
(74) *Attorney, Agent, or Firm* — Fish & Richardson P.C.

(57) ABSTRACT

Among other disclosed subject matter, a computer-implemented method that includes receiving content items, including text to be displayed on a user's mobile browser. The method also includes determining whether the mobile browser supports floating text columns. The method also includes determining whether at least some of the text should be displayed vertically on the mobile browser, including determining if non-Latin characters are included in the text if the mobile device supports floating text columns. The method also includes rotating text characters of at least some of the text to display vertically in a floating text column, if the text should be displayed vertically.

20 Claims, 6 Drawing Sheets

(56) References Cited

U.S. PATENT DOCUMENTS

| | | | |
|---|---|---|---|
| 6,321,243 B1* | 11/2001 | Ballard | 715/202 |
| 6,324,554 B1* | 11/2001 | Watanabe et al. | 715/235 |
| 6,332,046 B1* | 12/2001 | Fujimoto et al. | 382/289 |
| 6,339,426 B1* | 1/2002 | Lui et al. | 345/467 |
| 6,473,196 B2* | 10/2002 | Usami et al. | 358/1.18 |
| 6,624,910 B1* | 9/2003 | Koh et al. | 358/1.18 |
| RE38,471 E * | 3/2004 | Howard et al. | 345/571 |
| 6,765,577 B1* | 7/2004 | Tang et al. | 345/471 |
| 6,826,727 B1* | 11/2004 | Mohr et al. | 715/235 |
| 6,952,281 B1* | 10/2005 | Irons et al. | 358/1.15 |
| 6,975,333 B2* | 12/2005 | Kanai et al. | 345/619 |
| 6,981,209 B1* | 12/2005 | Parikh et al. | 715/212 |
| 7,076,732 B2* | 7/2006 | Nagao | 715/233 |
| 7,102,643 B2* | 9/2006 | Moore et al. | 345/473 |
| 7,124,360 B1* | 10/2006 | Drenttel et al. | 715/205 |
| 7,151,860 B1* | 12/2006 | Sakai et al. | 382/297 |
| 7,237,252 B2 | 6/2007 | Billmaier | |
| 7,287,220 B2* | 10/2007 | Kaasila et al. | 715/201 |
| 7,487,185 B2* | 2/2009 | Lomelin-Stoupignan et al. | 1/1 |
| 7,523,393 B2* | 4/2009 | Joshi et al. | 715/234 |
| 7,581,180 B2* | 8/2009 | Masui et al. | 715/259 |
| 7,639,257 B2* | 12/2009 | Renner | 345/467 |
| RE41,088 E * | 1/2010 | Anderson | 348/272 |
| 7,665,032 B2* | 2/2010 | Fisher et al. | 715/779 |
| 7,849,403 B2* | 12/2010 | Joshi et al. | 715/234 |
| 7,930,208 B2* | 4/2011 | Sharman et al. | 705/14.53 |
| 7,973,946 B2* | 7/2011 | Fay et al. | 358/1.11 |
| 2001/0013012 A1* | 8/2001 | Hanaoka et al. | 705/14 |
| 2001/0043349 A1* | 11/2001 | Bobrow et al. | 358/1.12 |
| 2001/0047394 A1* | 11/2001 | Kloba et al. | 709/217 |
| 2002/0031264 A1* | 3/2002 | Fujimoto et al. | 382/199 |
| 2002/0087529 A1* | 7/2002 | Dutcher et al. | 707/3 |
| 2003/0035011 A1* | 2/2003 | Lee et al. | 345/780 |
| 2003/0126559 A1* | 7/2003 | Fuhrmann | 715/513 |
| 2003/0137534 A1* | 7/2003 | Hong | 345/738 |
| 2003/0151613 A1* | 8/2003 | Kanai et al. | 345/613 |
| 2003/0229854 A1* | 12/2003 | Lemay | 715/513 |
| 2004/0044964 A1* | 3/2004 | Martens et al. | 715/517 |
| 2004/0141016 A1* | 7/2004 | Fukatsu et al. | 345/856 |
| 2004/0141643 A1* | 7/2004 | Marquering et al. | 382/173 |
| 2004/0177323 A1* | 9/2004 | Kaasila et al. | 715/513 |
| 2004/0255244 A1* | 12/2004 | Filner et al. | 715/517 |
| 2005/0028086 A1* | 2/2005 | Itavaara et al. | 715/513 |
| 2005/0138555 A1* | 6/2005 | Fushiki et al. | 715/531 |
| 2005/0140661 A1 | 6/2005 | Collins | |
| 2005/0154971 A1* | 7/2005 | Nagao | 715/500 |
| 2005/0183033 A1* | 8/2005 | Feinberg et al. | 715/809 |
| 2005/0257140 A1* | 11/2005 | Marukawa | 715/513 |
| 2006/0136571 A1* | 6/2006 | Kloba et al. | 709/217 |
| 2006/0212829 A1* | 9/2006 | Yahiro et al. | 715/810 |
| 2006/0224947 A1* | 10/2006 | Weber et al. | 715/503 |
| 2007/0006095 A1* | 1/2007 | Feng | 715/800 |
| 2007/0168883 A1* | 7/2007 | Sugimoto | 715/818 |
| 2007/0233695 A1* | 10/2007 | Boudreau et al. | 707/10 |
| 2008/0008439 A1* | 1/2008 | Liu et al. | 386/46 |
| 2008/0082911 A1* | 4/2008 | Sorotokin et al. | 715/236 |
| 2008/0094368 A1 | 4/2008 | Ording et al. | |
| 2008/0115046 A1* | 5/2008 | Yamaguchi | 715/201 |
| 2008/0215672 A1* | 9/2008 | Kloba et al. | 709/203 |
| 2008/0232774 A1* | 9/2008 | Ikeda et al. | 386/95 |
| 2008/0243477 A1* | 10/2008 | Bush | 704/8 |
| 2008/0243619 A1* | 10/2008 | Sharman et al. | 705/14 |
| 2008/0313528 A1* | 12/2008 | Chang et al. | 715/200 |
| 2009/0180694 A1* | 7/2009 | Chen | 382/185 |
| 2009/0187815 A1* | 7/2009 | Becerra et al. | 715/212 |
| 2009/0307578 A1* | 12/2009 | Wei | 715/227 |
| 2010/0061635 A1* | 3/2010 | Ihara | 382/185 |
| 2010/0115452 A1* | 5/2010 | Chabot et al. | 715/779 |
| 2010/0269108 A1* | 10/2010 | Boudreau et al. | 717/178 |
| 2011/0078208 A1* | 3/2011 | Arseneault | 707/802 |
| 2011/0119586 A1* | 5/2011 | Blinnikka et al. | 715/719 |
| 2011/0161178 A1* | 6/2011 | Rosenstein et al. | 705/14.69 |
| 2013/0151953 A1* | 6/2013 | Konno | 715/245 |

FOREIGN PATENT DOCUMENTS

| | | |
|---|---|---|
| CN | 1902696 | 1/2007 |
| JP | 60176373 U | 9/1985 |
| JP | 8256256 A | 10/1996 |
| JP | 11261798 A | 9/1999 |
| JP | 2000089880 A | 3/2000 |
| JP | 2001188774 A | 7/2001 |
| JP | 2002007106 A | 1/2002 |
| JP | 2002074175 A | 3/2002 |
| JP | 2002112238 A5 | 4/2002 |
| JP | 2002273943 A5 | 9/2002 |
| JP | 2003141014 A | 5/2003 |
| JP | 2004152074 A | 5/2004 |
| JP | 2004259276 A5 | 9/2004 |
| WO | WO2005066951 | 7/2005 |
| WO | 2008/093156 | 8/2008 |

OTHER PUBLICATIONS

Floatutorial—simple tutorials on CSS floats by Max design Jul. 2007.*
Translation of JP2004152074 Author: Jinba Tomonari Date: 2004.*
Authorized Officer Seon Kyoung Han, International Search Report and Written Opinion dated Mar. 31, 2010 for International Application No. PCT/US2009/058096, 12 pages.
Office Action; Dec. 17, 2013; Japan; 2011-530115; 5 pages.
Office Action in Chinese Application No. 200980147506.2, dated Jan. 30, 2014, 41 pages (with English translation).
Office Action in Chinese Application No. 200980147506.2, dated Aug. 29, 2014, 41 pages (with English translation).

* cited by examiner

DISPLAYING VERTICAL CONTENT ON SMALL DISPLAY DEVICES

TECHNICAL FIELD

The subject matter of this specification is generally related to content presentation.

BACKGROUND

Interactive media (e.g., the Internet) has great potential for improving the targeting of advertisements ("ads") to receptive audiences. For example, some websites provide information search functionality that is based on keywords entered by the user seeking information. This user query can be an indicator of the type of information of interest to the user. By comparing the user query to a list of keywords specified by an advertiser, targeted ads can be provided to the user.

A number of problems can arise by the placement of ads with non-ad content (e.g., search results) on devices with small displays, such as, mobile phones or personal digital assistants. If the ads are placed above the non-ad content, the user may be frustrated by the need to scroll or page down in the small display to view the desired non-ad content. If the ads are placed below the non-ad content, the user may not notice the ads, reducing their value to advertisers.

SUMMARY

A technique, method, apparatus, computer program product, and system are described for vertically displaying text of content items on small display devices. In some implementations, individual characters (e.g., Chinese, Japanese or Korean characters) of text can be displayed vertically in one or more left-hand or right-hand columns of a display. Text strings (e.g., Latin characters, a URL included in the text) can be converted to one or more images, and the images can be rotated for display in a column.

In some implementations, a computer-implemented method includes: receiving content items, including text to be displayed on a user's mobile browser; determining whether the mobile browser supports floating text columns; if the mobile device supports floating text columns, determining whether at least some of the text should be displayed vertically on the mobile browser, including determining if non-Latin characters are included in the text; and if the text should be displayed vertically, rotating text characters of at least some of the text to display vertically in a floating text column.

In some implementations, a computer-implemented method includes: receiving a plurality of content items, including text, to be displayed on a user's mobile browser; determining whether the user's browser supports floating image columns; if the browser supports floating image columns: mapping the text to one or more images; rotating the images of individual text characters that should not be displayed vertically; and displaying the images of rotated text characters that should be displayed vertically and the images of text that should not be displayed vertically in at least one floating image column.

In some implementations, a computer system includes a means for receiving content items, including text to be displayed on a user's mobile browser; a means for determining whether the mobile browser supports floating text columns; a means for determining whether at least some of the text should be displayed vertically on the mobile browser, including determining if non-Latin characters are included in the text; and a means for rotating text characters of at least some of the text to display vertically in a floating text column.

In some implementations, a computer system includes: a module for receiving content items, including text to be displayed on a user's mobile browser; a module for determining whether the mobile browser supports floating text columns; a module for determining whether at least some of the text should be displayed vertically on the mobile browser, including determining if non-Latin characters are included in the text; and a module for rotating text characters of at least some of the text to display vertically in a floating text column.

Particular embodiments of the subject matter described in this specification can be implemented to realize one or more of the following advantages. Displaying ad text vertically next to non-ad content on small display devices allows the ads to be more noticeable without requiring a user to scroll or page down in the small display to view the non-ad content. This technique can be especially useful for content displayed in languages where text is commonly displayed vertically, such as, Chinese, Japanese, and Korean. Vertical display of text can be applied to other types of content items, for example, headline news, real time quotes, email header information and announcements. This technique also can apply to local weather, new incoming email highlights or user customized message alerts.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
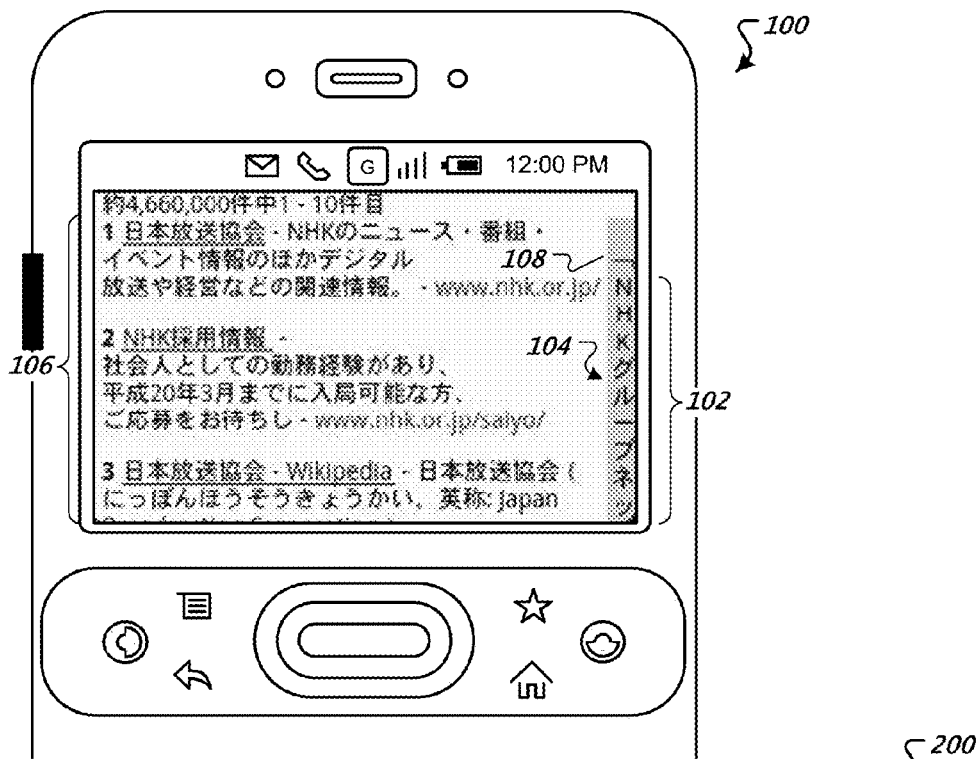
FIGS. 1-3 are examples of small display devices each displaying one or more vertical text advertisements.

In an online advertising system, a computer network, such as a local area network (LAN), wide area network (WAN), the Internet, or a combination thereof, can connect advertisers, an advertising system, publishers, and users. In some implementations, advertisers can directly, or indirectly, enter, maintain, and track advertisement ("ad") information in the advertising system. Publishers may submit requests for advertisements to the advertising system. While reference is made to advertising, other forms of content including other forms of sponsored content can be delivered by the system.

One example of a publisher is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results. The search service can submit a request for ads to the advertising system. The search service can combine the search results with one or more of the ads provided by the advertising system. This combined information can be sent to (or rendered by) the user device that requested the content for presentation in a viewer (e.g., a browser or other content display system).

An advertisement from a particular advertiser provided by the advertising system can include a description in the form of a universal resource locator (URL) link to a web page for the advertiser. Alternatively, the description of the advertisement may be delivered along with the URL link. In some implementations, a user can be directed to the advertiser's web page after the user interacts with (e.g., selects or clicks) the URL link.

The displays on mobile devices are typically small relative to personal computer (PC) displays, such that Internet services (e.g., Internet search service with advertisement delivery) do not always translate well from typical PC displays to mobile device displays. As a result, certain services must be provided in different formats, e.g. one for the desktop and one for the mobile device display. For example, if an advertiser has advertisements for display on PCs and mobile devices, the advertiser may have different landing pages for the advertisements for the different platforms. In another example, the presentation of advertisements with search results can differ for different platforms.

Vertical display of text ads allows the text ads and non-ad content (e.g., search results) to be viewed simultaneously on small display devices (e.g., mobile phones or personal digital assistants). This technique can be especially useful for content displayed in languages where text is commonly displayed vertically, such as Chinese, Japanese, and Korean. Individual characters (e.g., Chinese, Japanese, or Korean characters) of an ad can be displayed vertically in one or more left-hand or right-hand columns of a small display. Latin characters (e.g., a URL included in the ad) can be converted to one or more images, and the images can be rotated for display in a column. In other implementations, headline news, real-time quotes, or other announcements can be vertically displayed.

Figure 2:
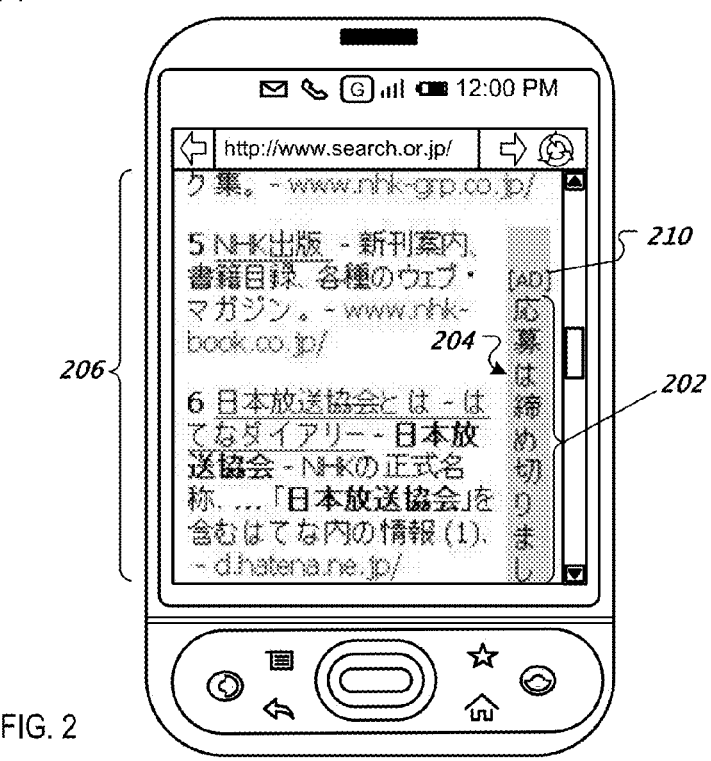
Figure 3:
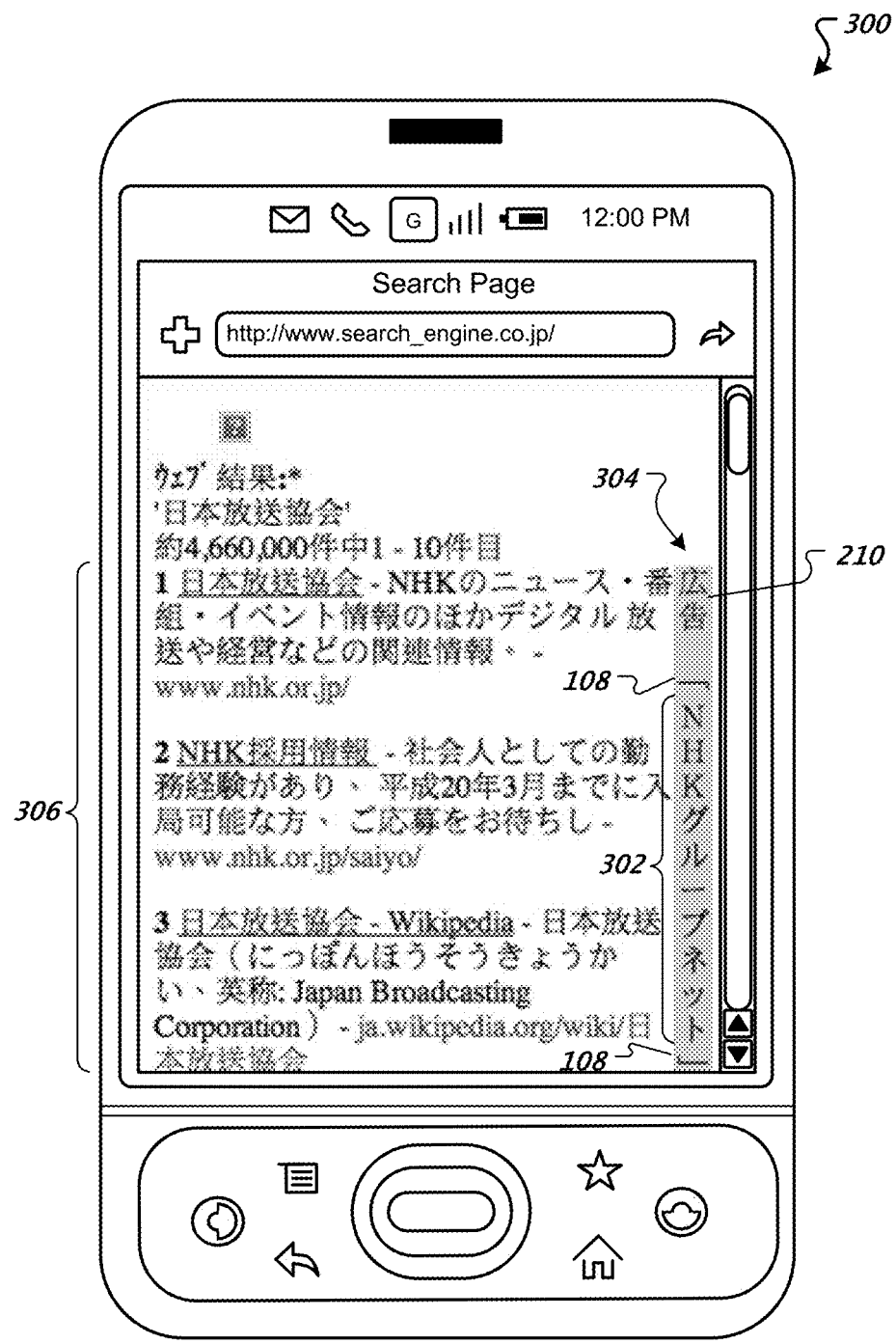

FIGS. 1-3 are examples 100, 200, 300, respectively, of small display devices each displaying one or more vertical text advertisements 102, 202, 302, respectively. Although each of the examples 100, 200, 300 illustrate vertical text advertisements displayed with Internet search results in Japanese, vertical text advertisements can be displayed with any type of ad or non-ad content in any language. Additionally, vertical text advertisements can be displayed in one or more locations on the displays of small display devices, such as, along the right-hand side, along the left-hand side, down the center of the small display, or anywhere in between.

The small displays present floating columns 104, 204, 304, which include the vertical text advertisements, alongside groups 106, 206, 306 of Internet search results. The floating columns 104, 204, 304 can be floating text columns or floating image columns, depending, in part, on the features and limitations of the viewer (e.g., a browser or other content display system) for the particular small display device.

In some implementations, a floating column 104, 204, 304 can have a different background color or pattern than the background color or pattern of the rest of the small display to indicate that the contents of the floating column 104, 204, 304 include advertising. In some implementations, a vertical text advertisement 102, 302 displayed in a floating column 104, 304, respectively, can be delineated from other advertisements in the floating column 104, 304 by brackets 108 or other symbols. In some implementations, a floating column 204, 304 can include a label 210 at the top of the floating column 204, 304 to indicate that the contents of the floating column 204, 304 include advertising.

In some implementations, the vertical text advertisements 102, 202, 302 can include titles and descriptions. In other implementations, the vertical text advertisements 102, 202, 302 can only include titles, which can be selectable URL links to the advertisers' web pages.

For some small display devices, if the device is rotated from a portrait orientation (as illustrated in FIGS. 1-3) to a landscape orientation (not shown), the viewer (e.g., a browser) of the device will also rotate the content presented in the small display. As a result, vertical text advertisements will still be displayed in a floating column alongside other content presented in the small display. In some implementations, when content is displayed in a landscape orientation, vertical text advertisements can be presented in multiple (e.g., two or three) columns of the small display. In some implementations, advertisements can be reformatted to a standard horizontal form if the device is rotated to landscape orientation.

In some implementations, the advertising system can use the same advertisement selection process whether text advertisements are displayed vertically or horizontally. In other implementations, the advertising system can use a different advertisement selection process when text advertisements are displayed vertically. For example, an advertisement selected (e.g., using a ranking algorithm) for display can be "promoted" or "demoted" to an advertisement slot in a floating column for vertical display from a different advertisement area (e.g., above or below the non-ad content) for horizontal display.

Figure 4:
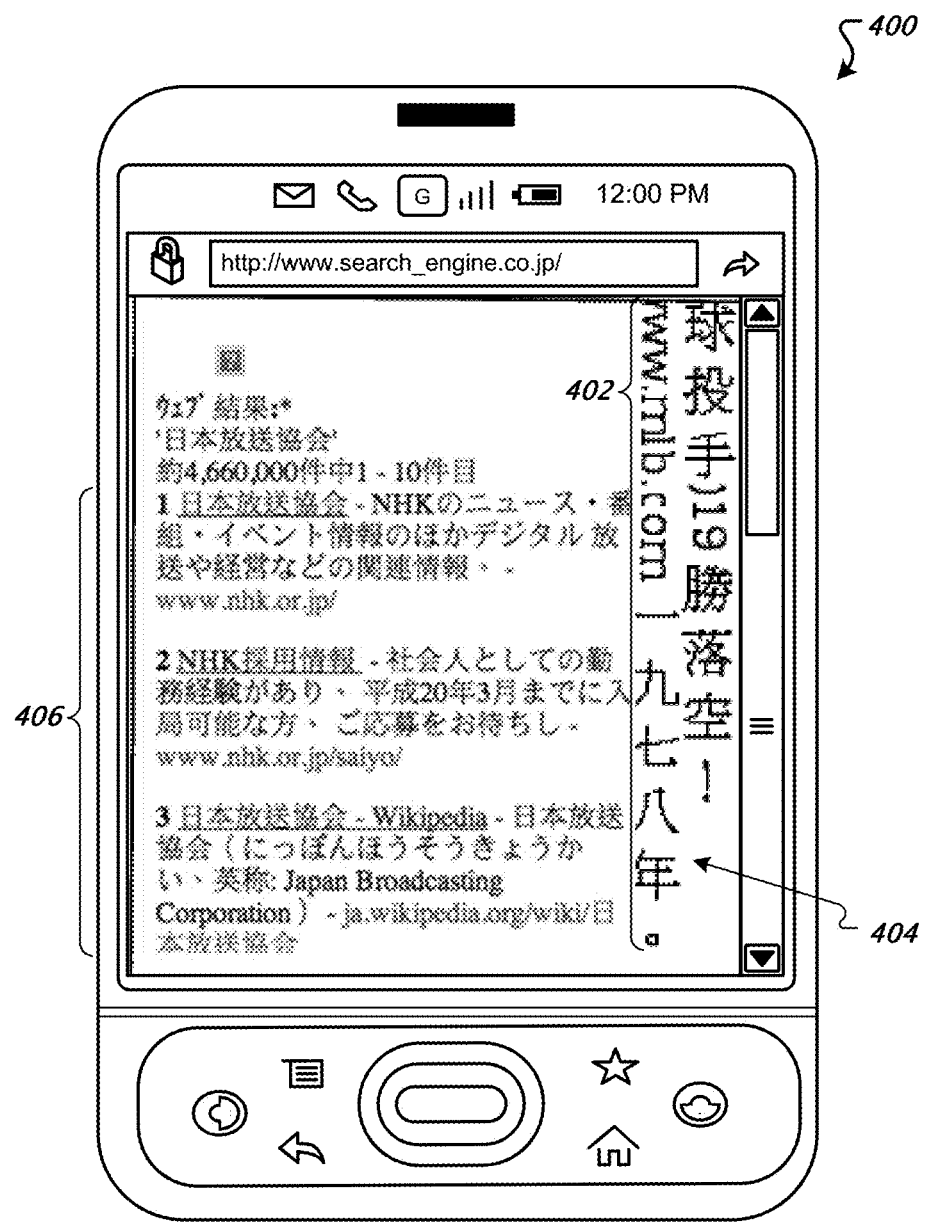
FIG. 4 is an example of a small display device displaying mixed vertical and horizontal text in an advertisement.

FIG. 4 is an example 400 of a small display device displaying mixed vertical and horizontal text in an advertisement. The small display presents a floating column 404, which includes a vertical text advertisement 402 alongside a group 406 of Internet search results.

The vertical text advertisement 402 includes Japanese characters (Kanji and katakana), digits, punctuation, and a URL link written in Latin characters. In some implementations, digits, punctuation, and/or Latin characters in a vertical text advertisement can be treated as images and rotated. Some digits, punctuation, and/or Latin characters in a vertical text advertisement can be rotated as images while others can be treated as text and displayed vertically.

Whether digits, punctuation, or characters are treated as text or images can depend, in part, on the features and limitations of a display device's viewer (e.g., a browser). For example, for vertical display of a text advertisement, a browser may need to support floating columns displayed on a left-hand or right-hand side of the device's display. Some browsers, however, allow floating images but not floating text. For these browsers, text of an advertisement can be converted to an image and rotated ninety degrees for display in a floating column.

In FIG. 4, the URL link written in Latin characters of the vertical text advertisement 402 is converted to an image and rotated ninety degrees. The URL link is displayed as horizontal text in the vertical text advertisement 402. Similarly, the digits "0" to "9" and punctuation are displayed as rotated images in the vertical text advertisement 402.

Figure 5:
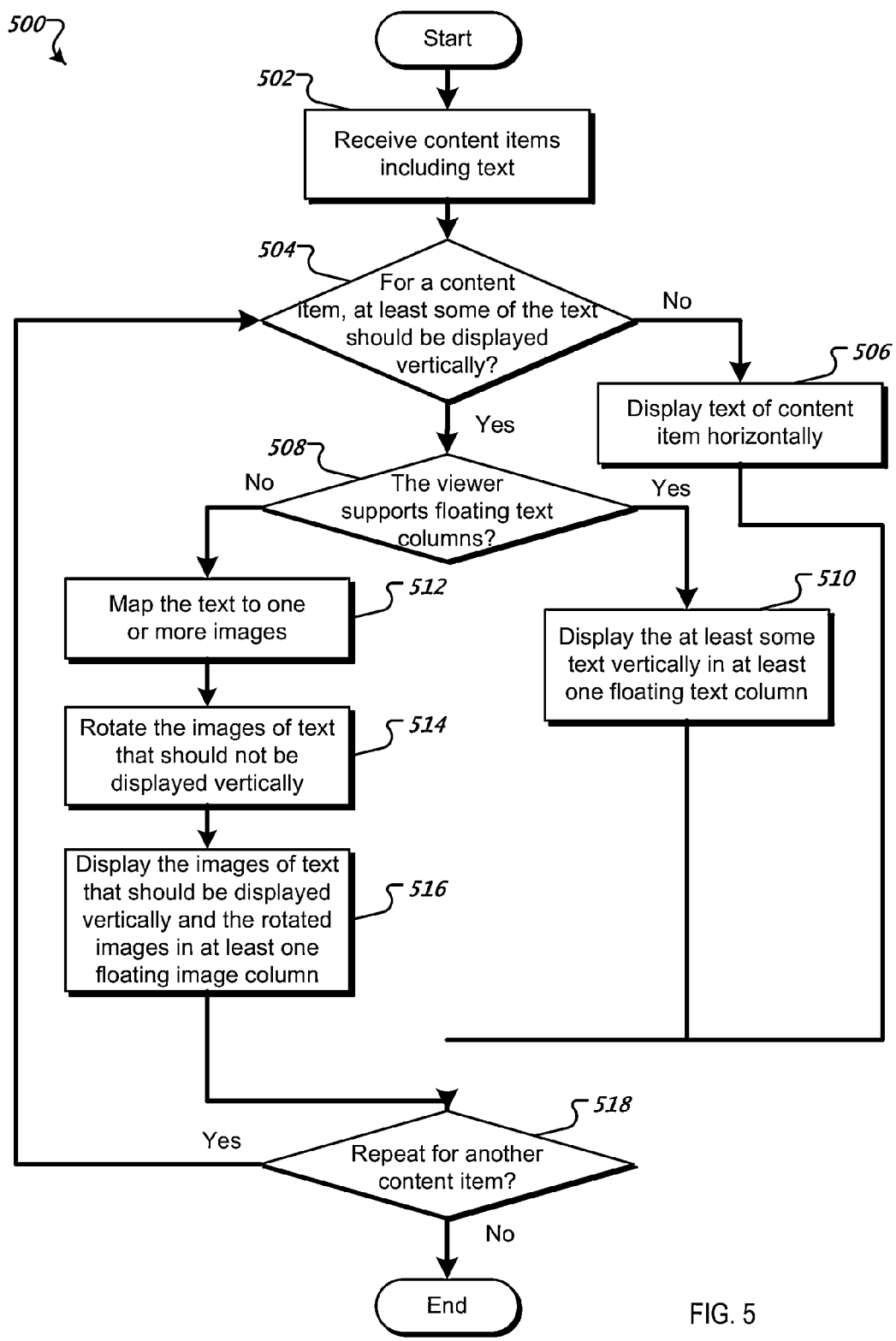
FIG. 5 is a flowchart of an example process for vertically displaying text of one or more content items.

FIG. 5 is a flowchart of an example process 500 for vertically displaying text of one or more content items. For convenience, the process 500 will be described with reference to an advertising system, which can perform the process. The one or more content items are to be displayed by a viewer (e.g., a browser) of a small display device.

One or more (e.g., multiple) content items including text are received (step 502). For example, an advertising system can receive multiple text advertisements identified from one or more advertisement databases. In some implementations, the received multiple text advertisements can be identified in response to a search query submitted by a user.

For at least one of the multiple content items, a determination is made whether at least some of the text should be displayed vertically (decision 504). For example, the advertising system can detect the viability or quality of an advertisement for vertical display.

In some implementations, determining whether at least some of the text should be displayed vertically can include determining that at least some of the text should be displayed vertically if the text includes Chinese, Japanese, or Korean characters or if the content item was specified for vertical display by a provider of the content item. For example, an advertiser can specify that a particular advertisement should be vertically displayed alongside search results. In some implementations, when an advertiser specifies an advertisement for vertical display, a bidding algorithm used in the selection and/or ranking of the advertisements for display can be modified.

In some implementations, determining whether at least some of the text should be displayed vertically can include determining that none of the text should be displayed vertically if the text includes a number of Latin characters that exceeds a defined value (e.g., ten). A determination that none of the text should be displayed vertically can also be made if the text includes a number of consecutive Latin characters that exceeds a defined value (e.g., three). Alternatively or in addition, a determination that none of the text should be displayed vertically can be made if the ratio of Latin characters to all characters in the text exceeds a defined value (e.g., 25%). In some implementations, a determination that none of the text should be displayed vertically can be made if a vertical display length of the content item would exceed a defined value. For example, if the vertical display length of a text advertisement is greater than the vertical dimension of the device's small display, the advertising system can determine that none of the text of the text advertisement should be displayed vertically.

If it is determined that none of the text of the content item should be displayed vertically ("no" branch of decision 504), the text of the content item is displayed horizontally (step 506). For example, if the content item is a text advertisement, the advertising system can present the text advertisement horizontally above or below non-ad content in the display.

If it is determined that at least some of the text of the content item should be displayed vertically ("yes" branch of decision 504), a determination is made whether the viewer supports floating text columns (decision 508). For example, the advertising system can detect the type of browser supported by the small display device, where certain types of browsers support certain types of markup languages. Examples of markup languages include Extensible HyperText Markup Language (XHTML), Compact HTML (CHTML), and Wireless Markup Language (WML). The markup language supported can determine whether the browser can display floating text columns.

If the viewer supports floating text columns ("yes" branch of decision 508), the at least some of the text of the content item is displayed vertically in at least one floating text column (step 510). For example, the advertising system can display at least some of the text of a text advertisement vertically in at least one floating text column alongside other received content (e.g., non-ad content).

In some implementations, if the viewer (e.g., a browser) does not support floating text columns, reference text cannot be displayed in the vertical direction, such as a reference URL and phone number. In other implementations, if the viewer does not support floating text columns ("no" branch of decision 508), the text of the content item is mapped to one or more images (step 512). The images of text that should not be displayed vertically are rotated (step 514), for example, by ninety degrees in a clockwise direction. The images of text that should be displayed vertically and the rotated images of text that should not be displayed vertically are displayed in at least one floating image column (step 516). For example, the advertising system can convert the text of an advertisement to multiple images, rotate the images of text to be displayed horizontally, and vertically display the rotated and un-rotated images in at least one floating image column alongside other received content (e.g., non-ad content).

A determination is made whether steps 504-516 of the example process 500 should be repeated for another content item of the multiple received content items (decision 518). If it is determined that the steps should be repeated for another content item ("yes" branch of decision 518), the example process 500 repeats from step 504. If it is determined that the steps should not be repeated for another content item ("no" branch of decision 518), the example process 500 ends.

In some implementations, text of a content item can be displayed vertically as a selectable hyperlink. For example, the vertical text advertisements 102, 202, 302 of FIGS. 1-3, respectfully, can be displayed as selectable hyperlinks to the respective advertiser's web page. In some implementations, text of a content item can be displayed vertically in at least one column alongside other received content (e.g., non-ad content), where the at least one column is displayed on a left-hand side or a right-hand side of a display of a mobile device (e.g., a mobile phone).

In some implementations, text of a content item can include an address for a resource associated with the content item, and the address for the resource includes Latin characters. For example, the vertical text advertisement 402 of FIG. 4 includes a URL link to the advertiser's web page, where the URL link includes Latin characters. When the resource address includes Latin characters, the characters of the resource address can be mapped (e.g., converted) to an image, the image can be rotated, and the rotated image can be displayed in at least one floating image column.

In some implementations, for each punctuation character or digit character in the text of a content item, a determination can be made whether the punctuation character or digit character should be displayed vertically. The advertising system can make the determination using one or more rules.

In some implementations, digits can be presented with vertical text in a single column in block form. For example, the date '2008' can be displayed in a column as

A
B
20
08
C.

In another example, a two-digit number can be presented horizontally alongside neighboring vertical text, such as

A
B 31
C.

This kind of presentation can be found in Japanese print media, for example. The determination of when to present digits this way can be made based on a number of factors, including but not limited to length or whether the digits are part of a conceptual unit like a date.

For example, it can be determined that a digit character should not be displayed vertically if the digit character is part of a resource address (e.g., a URL link). In this case, the digit character can be mapped to an image and rotated with the Latin characters. In another example, a determination that digit characters should not be displayed vertically can be made if the number of consecutive digit characters is less than a defined value (e.g., three). For example, the vertical text advertisement 402 of FIG. 4 has two consecutive digit characters (e.g., "1" and "9"), and a determination is made that the digit characters should be displayed as horizontal text and not vertical text. Alternatively, if the number of consecutive digit characters equals or exceeds the defined value, it can be determined that each digit character should be displayed vertically with one digit character per line.

Some punctuation characters (e.g., Chinese, Japanese, or Korean punctuation) defined in Unicode may not be fully supported in some small display device viewers (e.g., browsers). The display of punctuation characters can depend on the font used and can differ between different languages. If it is determined that a punctuation character should be displayed vertically, a determination can be made as to which Unicode punctuation character might work best in vertical form. For example, there are multiple "full stop" punctuation characters defined in Unicode (e.g., "。" or "。"). The "full stop" is printed in the center in Chinese, while the "full stop" is printed in the upper right in Japanese. The different appearance might be handled by the font. However, if the font does not handle the different appearance, the particular Unicode punctuation character might be selected for vertical display based on the language used.

Figure 6:
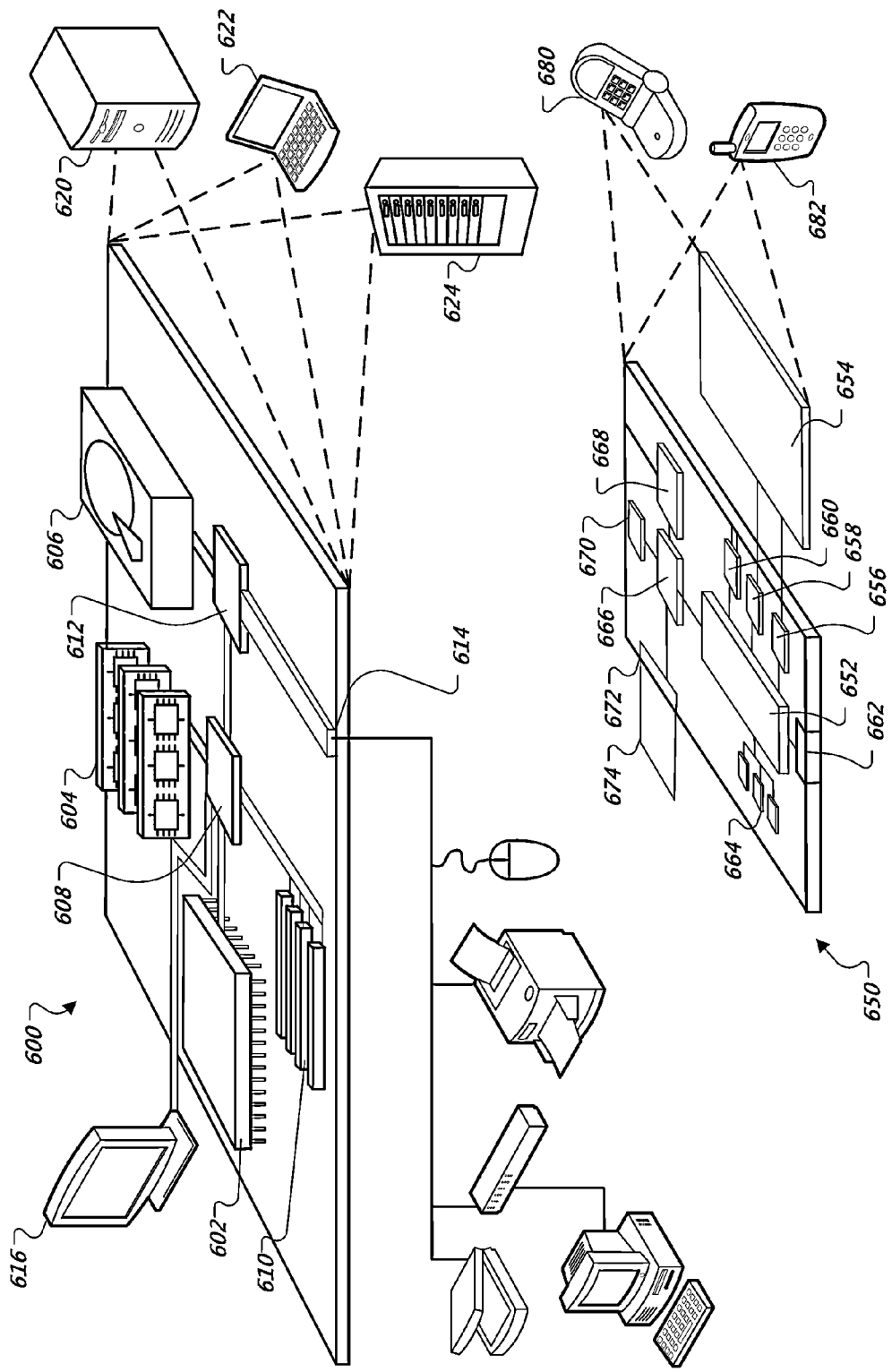
FIG. 6 is a block diagram of generic computing devices.

The FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Figure 7:
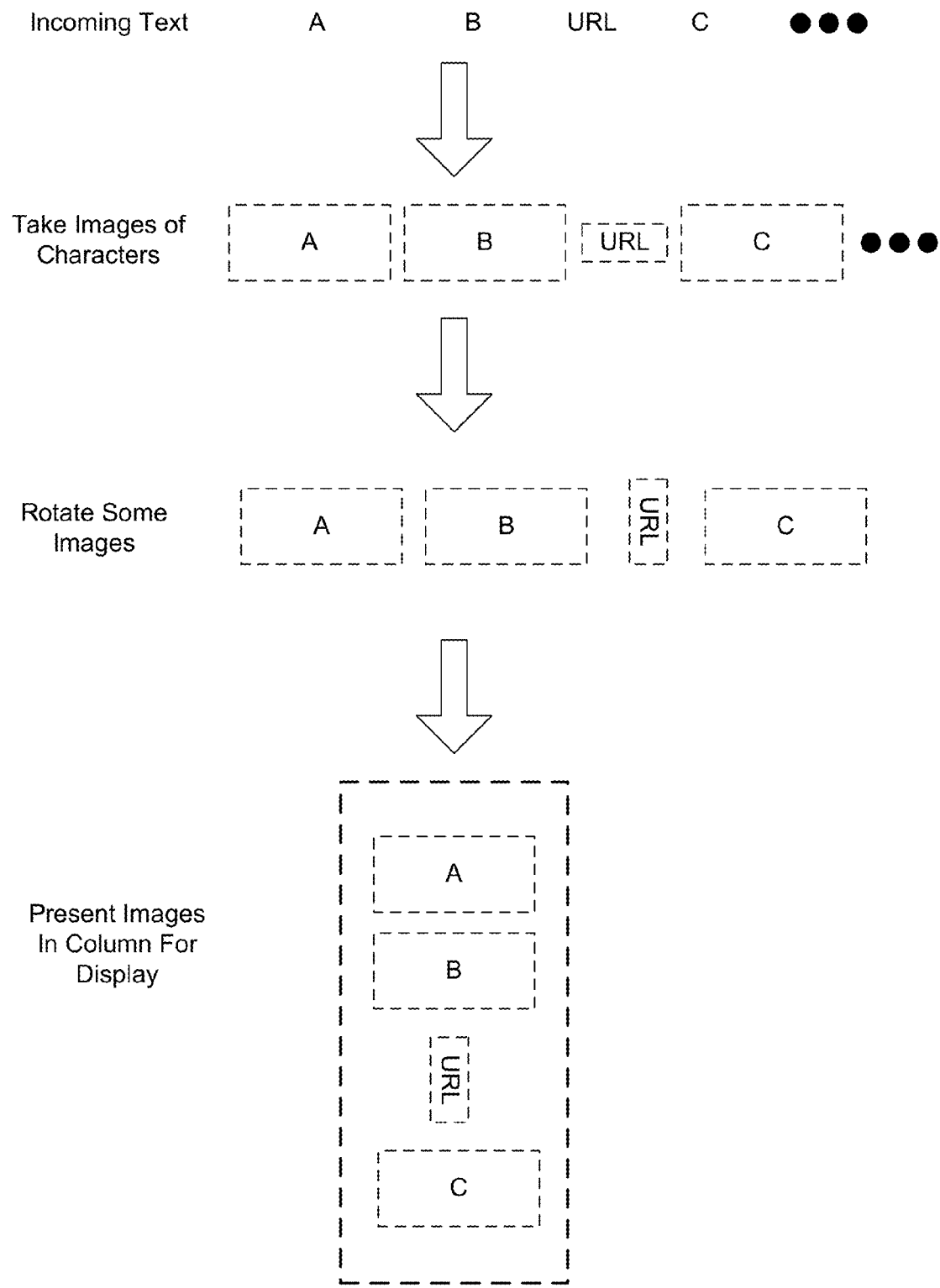
FIG. 7 illustrates an example process for displaying images of text in a floating text column.

FIG. 7 illustrates an example process for displaying images of text in a floating image column. In the example shown, a text string includes characters A B URL C. Images are taken of each character and the URL. Some of the images are rotated 90 degrees. In this example, the URL and C are rotated clockwise by 90 degrees. The rotated and non-rotated images are presented in a floating text column.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.), and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment. Method steps described herein can be implemented in modules executed by one or more processors or processing cores. Such modules are within the scope of the appended claims.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving an advertisement, the advertisement including text to be displayed in a user's mobile browser, wherein the mobile browser displays the ad along with other non-ad content, and wherein the text of the advertisement includes one or more Latin and one or more non-Latin characters;
   determining whether at least some of the text includes characters that should be displayed in a layout direction that is vertical in the mobile browser, wherein the determination is based at least in part on a determination that one or more non-Latin characters are in the text, and determining that none of the text should be displayed in the layout direction that is vertical if the text includes a number of Latin characters that exceeds a first defined value, the text includes a number of consecutive Latin characters that exceeds a second defined value, or if a ratio of Latin characters to all characters in the text exceeds a third defined value;
   determining whether the mobile browser supports floating text columns in response to a determination that at least some of the text includes characters that should be displayed in the layout direction that is vertical; and
   in response to a determination that at least some of the text includes characters that should be displayed in the layout direction that is vertical and that the mobile browser supports floating text, displaying the one or more non-Latin characters of the advertisement in the layout direction that is vertical in a floating text column that is distinct from a display of the other non-ad content in the mobile browser and wherein the one or more Latin characters of the advertisement are shown horizontally.

2. The method of claim 1, where determining whether at least some of the text includes characters that should be displayed in the layout direction that is vertical further comprises:
   determining that none of the text should be displayed in the layout direction that is vertical if a vertical display length of the advertisement would exceed a defined value.

3. The method of claim 1, where the text is displayed as a selectable hyperlink.

4. The method of claim 1, where the floating text column is displayed on a left-hand side or a right-hand side of a display of the mobile browser.

5. The method of claim 1, where the at least some of the text is vertically displayed in the floating text column by the browser.

6. The method of claim 1, wherein the one or more non-Latin characters comprise one or more Chinese, Japanese, or Korean characters.

7. A computer-implemented method comprising:
   receiving a plurality of content items, each content item including text to be displayed on a user's mobile browser;
   determining whether a content item includes text with characters that should be displayed in a layout direction that is vertical on the mobile browser and an address for a resource associated with the content item that should be displayed in a layout direction that is horizontal;
   based on a determination that the content item includes text that should be displayed in the layout direction that is vertical, determining that the user's browser does not support floating text columns but does support floating image columns;
   based on the determination that the browser supports floating image columns:
     mapping the text that should be displayed in the layout direction that is vertical to one or more images;
     mapping the text with the address for a resource associated with the content item that should be displayed in the layout direction that is horizontal to an image;
     rotating the image of the address for a resource associated with the content item; and
     vertically displaying, in at least one floating image column, each of the one or more images of the text that should be displayed in the layout direction that is vertical and the rotated image of the address for a resource associated with the content item.

8. The method of claim 7, further comprising:
   for each punctuation character or digit character in the text, determining whether the punctuation character or digit character should be displayed in the layout direction that is vertical.

9. A non-transitory storage device having instructions stored thereon, which, when executed by a processor, causes the processor to perform operations comprising:
   receiving an advertisement, the advertisement including text to be displayed in a user's mobile browser, wherein the mobile browser displays the ad along with other non-ad content, and wherein the text of the advertisement includes one or more Latin and one or more non-Latin characters;
   determining whether at least some of the text includes characters that should be displayed in a layout direction that is vertical in the mobile browser, wherein the determination is based at least in part on a determination that one or more non-Latin characters are in the text, and determining that none of the text should be displayed in the layout direction that is vertical if the text includes a number of Latin characters that exceeds a first defined value, the text includes a number of consecutive Latin characters that exceeds a second defined value, or if a ratio of Latin characters to all characters in the text exceeds a third defined value;

determining whether the mobile browser supports floating text columns in response to a determination that at least some of the text includes characters that should be displayed vertically; and in response to a determination that at least some of the text includes characters that should be displayed in the layout direction that is vertical and that the mobile browser supports floating text, displaying the one or more non-Latin characters of the advertisement in the layout direction that is vertical in a floating text column that is distinct from a display of the other non-ad content in the mobile browser and wherein the one or more Latin characters of the advertisement are shown horizontally.

10. The storage device of claim 9, where determining whether at least some of the text includes characters that should be displayed in the layout direction that is vertical further comprises:

determining that none of the text should be displayed in the layout direction that is vertical if a vertical display length of the advertisement would exceed a defined value.

11. The storage device of claim 9, where determining whether at least some of the text includes characters that should be displayed vertically further comprises:

determining that at least some of the text includes characters that should be displayed vertically if the content item was specified for vertical display by a provider of the content item.

12. The storage device of claim 9, where the text is displayed as a selectable hyperlink.

13. The storage device of claim 9, where the at least some of the text is vertically displayed in at least one column by a browser.

14. The storage device of claim 13, where the at least one column is displayed on a left-hand side or a right-hand side of the mobile browser.

15. The storage device of claim 13, where displaying the at least some of the text in the layout direction that is vertical in at least one column by a browser further comprises:

determining whether the browser supports floating text columns;

based on a determination that the browser supports floating text columns:

displaying the at least some of the text in the layout direction that is vertical in at least one floating text column; and based on a determination that the browser does not support floating text columns:

mapping the text to one or more images;

rotating the images of text that should not be displayed in the layout direction that is vertical; and displaying the images of text that should be displayed in the layout direction that is vertical and the rotated images of text that should not be displayed in the layout direction that is vertical in at least one floating image column.

16. The storage device of claim 15, where the text includes an address for a resource associated with the content item, and the address for the resource includes Latin characters.

17. The storage device of claim 15, further comprising:

mapping the characters of the address for the resource to an image;

rotating the image; and displaying the rotated image in at least one floating image column.

18. The storage device of claim 15, further comprising:

for each punctuation character or digit character in the text, determining whether the punctuation character or digit character should be displayed in the layout direction that is vertical.

19. A system for vertically displaying text of one or more content items, comprising:

one or more computers operable to perform instructions to:

receive an advertisement, the advertisement including text to be displayed in a user's mobile browser, wherein the mobile browser displays the ad along with other non-ad content, and wherein the text of the advertisement includes one or more Latin and one or more non-Latin characters;

determine whether at least some of the text includes characters that should be displayed in a layout direction that is vertical in the mobile browser, wherein the determination is based at least in part on a determination that one or more non-Latin characters are in the text, and determining that none of the text should be displayed in the layout direction that is vertical if the text includes a number of Latin characters that exceeds a first defined value, the text includes a number of consecutive Latin characters that exceeds a second defined value, or if a ratio of Latin characters to all characters in the text exceeds a third defined value;

determining whether the mobile browser supports floating text columns in response to a determination that at least some of the text includes characters that should be displayed in the layout direction that is vertical; and in response to a determination that at least some of the text includes characters that should be displayed in the layout direction that is vertical and that the mobile browser supports floating text, display the one or more non-Latin characters of the advertisement in the layout direction that is vertical in a floating text column that is distinct from a display of the other non-ad content in the mobile browser and wherein the one or more Latin characters of the advertisement are shown horizontally.

20. A computer system comprising:

a storage device; and one or more processors coupled to the storage device and configured to execute instructions stored on the storage device, wherein the instructions, when executed by the one or more processors, cause the computer system to perform operations comprising:

receiving a plurality of content items, each content item including text to be displayed on a user's mobile browser;

determining whether a content item includes text with characters that should be displayed in a layout direction that is vertical on the mobile browser and an address for a resource associated with the content item that should be displayed in a layout direction that is horizontal;

based on a determination that the content item includes text that should be displayed in the layout direction that is vertical, determining that the user's browser does not support floating text columns but does support floating image columns;

based on a determination that the browser supports floating image columns:

mapping the text that should be displayed in the layout direction that is vertical to one or more images;

mapping the text with the address for a resource associated with the content item that should be displayed in the layout direction that is horizontal to an image;

rotating the image of the address for a resource associated with the content item; and vertically displaying, in at least one floating text column, each of the one or more images of rotated text characters that should be displayed in the layout direction that is vertical and the rotated image of the address for a resource associated with the content item text in at least one floating image column.

\* \* \* \* \*